United States Patent
Pappalardo et al.

(10) Patent No.: US 7,292,664 B2
(45) Date of Patent: Nov. 6, 2007

(54) PROCESS AND DEVICE FOR SYNCHRONIZATION AND CODEGROUP IDENTIFICATION IN COMMUNICATION SYSTEMS OF THE CELLULAR TYPE

(75) Inventors: Francesco Pappalardo, Paterno (IT); Giuseppe Avellone, Palermo (IT); Elena Salurso, Agropoli (IT); Agostino Galluzzo, Palma di Montechiaro (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 825 days.

(21) Appl. No.: 10/684,217

(22) Filed: Oct. 10, 2003

(65) Prior Publication Data

US 2004/0132471 A1 Jul. 8, 2004

(30) Foreign Application Priority Data

Oct. 11, 2002 (EP) .................................. 02425619

(51) Int. Cl.
*H04L 7/00* (2006.01)
(52) U.S. Cl. .................................... 375/354; 370/514
(58) Field of Classification Search ................ 375/354, 375/149, 150; 370/514
See application file for complete search history.

(56) References Cited

U.S. PATENT DOCUMENTS 6,775,318 B2 * 8/2004 Chen et al. ................. 375/149

2002/0057664 A1 5/2002 Sarkar ......................... 370/342

FOREIGN PATENT DOCUMENTS

EP 1 100 210 A2 5/2001
EP 1 215 829 A2 6/2002

* cited by examiner

*Primary Examiner*—Kevin Kim
(74) *Attorney, Agent, or Firm*—Lisa K. Jorgenson; Dennis M. de Guzman; Seed IP Law Group PLLC

(57) ABSTRACT

To obtain frame synchronization and identify the cell codegroup in a cellular communication system (such as a system based upon the standard 3GPP FDD), there are available the synchronization codes organized in chips or letters transmitted at the beginning of respective slots. Slot synchronization is obtained previously in a first step of the operation of cell search. During a second step, there are acquired, by means of correlation or fast Hadamard transform, the energy values corresponding to the respective individual letters with reference to the possible starting positions of the corresponding frame within the respective slot. Operating in a serial way at the end of acquisition of the aforesaid energy values of the individual letters, or else operating in parallel, the energies of the corresponding words are determined. Of these energies only the maximum word-energy value and the information for the corresponding starting position are stored in a memory structure. Said maximum value and said starting position identify, respectively, the cell codes and the frame synchronization sought. One application is in mobile communication systems based upon standards such as UMTS, CDMA2000, IS95, or WBCDMA.

26 Claims, 2 Drawing Sheets

PROCESS AND DEVICE FOR SYNCHRONIZATION AND CODEGROUP IDENTIFICATION IN COMMUNICATION SYSTEMS OF THE CELLULAR TYPE

BACKGROUND OF THE INVENTION

1. Field of the Invention

The present disclosure generally relates to telecommunication techniques and has been developed with particular but not exclusive attention paid to its possible application to telecommunication systems based upon the CDMA/3GPP FDD standard (where said acronyms stand for Code-Division Multiple Access/Third-Generation Partnership Project Frequency Division Duplex).

Even if in what follows, for reasons of clarity and simplicity of exposition, practically exclusive reference will be made to this application, it should, however, borne in mind that the scope of the invention is more general. The invention is, in fact, applicable to all the telecommunication systems in which operating conditions of the type described in what follows occur: by way of non-exhaustive example, the satellite-telecommunication systems and the mobile cellular systems corresponding to the UMTS, CDMA2000, IS95 or WBCDMA standards may be cited.

2. Description of the Related Art

To enable acquisition of a base station by a mobile terminal included in a telecommunication system based upon the standard 3GPP FDD mode or the like, the corresponding receiver requires means capable of carrying out the function of frame synchronization and identification of the so-called codegroup. The possibility of executing the said functions is essential for the execution of the subsequent steps in the context of the cell-search system.

In particular, when a mobile terminal is turned on, it does not have any knowledge of the timing of the transmitting cell to which it is to be assigned. The 3GPP standard, therefore, proposes an initial cell-search procedure for acquiring the cell signal and synchronizing therewith.

Said procedure basically comprises three steps:

slot synchronization (first step);
frame synchronization and identification of the codegroup, i.e., the group of cell codes (second step); and
identification of the scrambling code (third step).

In the implementation of the second step described above, it is assumed that the slot synchronization has previously been obtained during the first step.

To obtain at this point the frame synchronization and identify the codegroup, in the second step the Secondary Synchronization Channel (SSCH) is used, on which there are transmitted, at the beginning of each slot, 256-chip codes (i.e., letters).

The sixteen 256-chip complex codes used by the standard are generated on the basis of the following rules:

a first sequence at chip rate b having a repetition period of 16 (i.e., repeating every 16 elements) is multiplied by a sequence 16 times slower according to the two formulas appearing below so as to obtain the base sequence z:

$z = <b, b, b, -b, b, b, -b, -b, b, -b, b, -b, -b, -b, -b, -b>$ $b = <1, 1, 1, 1, 1, 1, -1, -1, -1, 1, -1, 1, -1, 1, 1, -1>$

The base sequence z is then multiplied element by element by a Hadamard code of length 256 chosen according to the following rule: if m is the number identifying the Secondary Synchronization Code (SSC) to be generated, the number of the Hadamard code to be multiplied by the sequence z is equal to $16 \times (m-1)$, with m ranging from 1 to 16.

In the solutions known to the art, execution of the second step of cell search envisages that in a frame there will be transmitted on the Synchronization CHannel (SCH) only 15 Secondary Synchronization Codes SSCs making up a word which identifies the cell. The possible letters are sixteen (as many as the codes). Of all the possible words made up of 15 letters that can be formed from the previous set (formed by the 16 letters), the standard uses only a set of 64 possible words (belonging to a Reed-Solomon code defined by the standard).

To identify a single letter, the solutions according to the known art envisage sending the input to a bank of correlators or to a bank of furniture which carry out the Fast Hadamard Transform (FHT), so as to obtain at output the energies corresponding to the individual letters.

The values representing the energy of the individual letters (codes) are appropriately summed and stored in a bank of registers, in which each row represents one of the words of the code that is to be recognized. The columns represent, instead, the possible starting points of the frame in the slot (15 possible starting points).

The above solution is schematically represented in the diagram of FIG. 1, where the reference 10 designates a bank of correlators at the output of which signals indicating the energies of the individual letters are generated. After a possible masking, represented by a block 12, the energies are added in a node 14 and are then stored in a bank of registers 16.

In the example represented in FIG. 1, the bank 16 comprises 64 rows and 15 columns, each row representing one of the words of the code that is to be recognized, whilst each of the columns represents a possible starting point of the frame.

Designated by the reference number 18 is a block basically comprising a comparator which enables the search for the maximum value on the memory bank 16 to be carried out, so as to define both the codegroup CD used by the cell currently being evaluated and the start of the frame, basically expressed as frame offset OF, transmitted by the cell itself; it is, in other words, a quantity which identifies the frame synchronization with reference to the slot timing obtained in the first step (not illustrated specifically in the drawings).

The solution according to the known art represented in FIG. 1 requires therefore a memory formed by 64 rows and 15 columns, where each cell is formed by $(n+\log_2 15)$ bits, where n corresponds to the number of bits at output from the bank of correlators.

An accumulator is moreover necessary, which adds the energy of the new letter for the word corresponding to the memory cell according to the value contained therein. This is performed for all the 64*15 memory cells, with an appropriate choice of the letters to be added each time. Said choice is managed by a control unit 20 programmed with an appropriate software.

BRIEF SUMMARY OF THE INVENTION

An embodiment of the present invention provides a solution which will be able to carry out the functions described previously in a simplified way so as to perform, for example, a search of the codegroup of the offset directly in a hardware mode with a dedicated circuit.

Basically, the solution according to one embodiment of the present invention envisages simplifying the size of the memory and of the corresponding processing circuit, further reducing the computational complexity.

As compared to known solutions, an embodiment of the solution proposed herein, which is based upon a technique of recycling of the acquired data, is simpler, occupies less space and consumes less power.

BRIEF DESCRIPTION OF THE SEVERAL VIEWS OF THE DRAWINGS

One or more embodiments of the invention will now be described, purely by way of non-limiting example, with reference to the annexed drawings, in which.

DETAILED DESCRIPTION

Embodiments of a process and device for synchronization and codegroup identification in communication systems of the cellular type are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
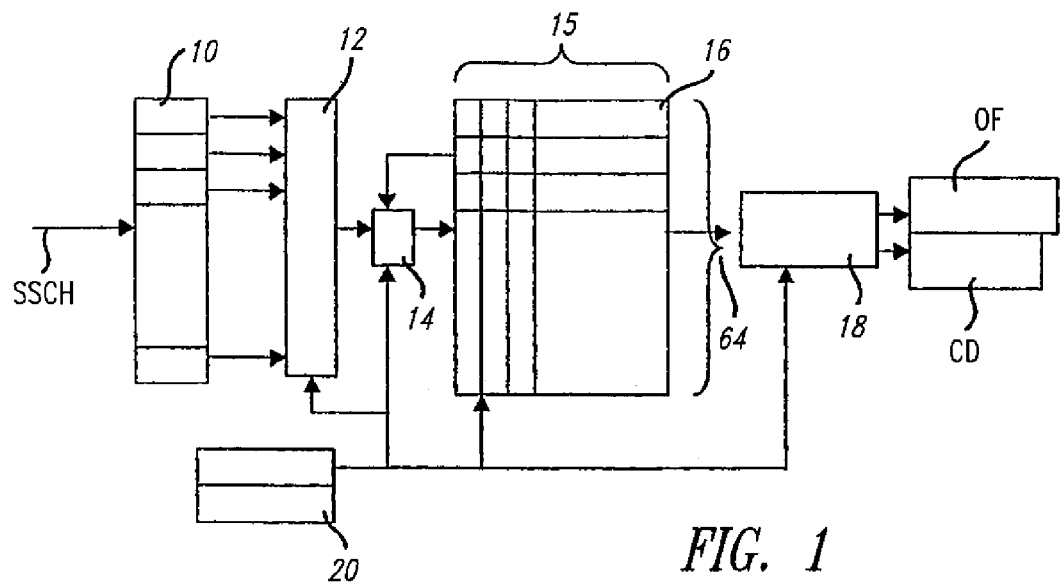
FIG. 1, which regards the prior art, has already been described previously.
Figure 2:
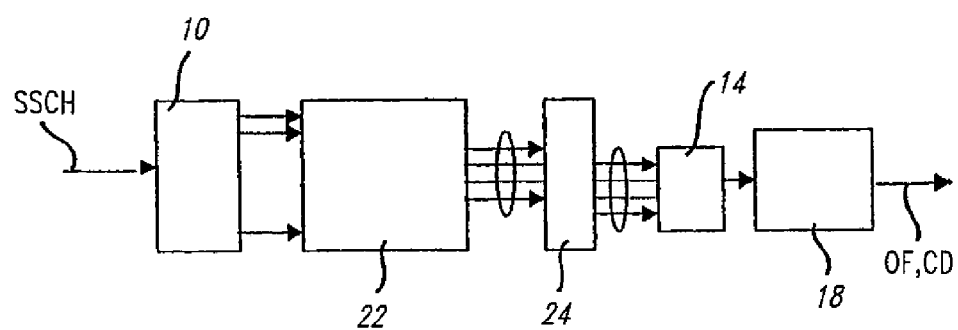
FIG. 2 illustrates, in the form of a block diagram, an architecture operating according to an embodiment of the invention.

In the diagram of FIG. 2, parts that are identical or functionally equivalent to the ones illustrated in FIG. 1 are designated by the same references already used in FIG. 1.

Basically, the architecture represented in FIG. 2 does not store the partial sums of the energy of the individual 64 words generated by the bank of correlators 10 (or, in a similar way, by a bank of FHT modules).

Instead, in the solution of FIG. 2, only the energy values of the individual letters for all the 15 possible letters are stored. It is only at the end of acquisition of the energy of the individual letters that the energies of the words are calculated in a serial way, keeping in memory just the highest energy value and the position thereof, or else the type of word and the offset thereof.

In the diagram of FIG. 2, the reference number 22 designates a bank of registers comprising 16 rows or lines of 15 elements, whilst the reference number 24 designates a multiplexer designed for supplying the summation node set upstream of the maximum-detection module designated by 18.

Figure 3:
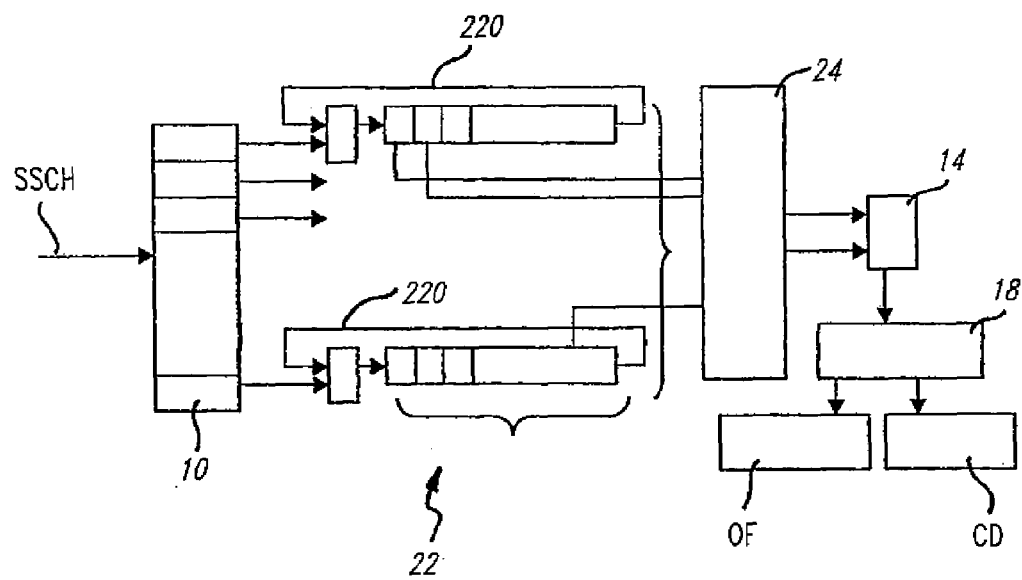
FIG. 3 represents a more detailed circuit diagram of the solution illustrated in FIG. 2.

As is illustrated in greater detail in the diagram of FIG. 3, in the memory bank 22 (the dimensions of which are 16 rows—representing the letters—by 15 columns—representing the slots), the energies estimated for the individual letters in all the 15 slots of the observation window are stored.

At the end of the acquisition, by means of the multiplexer block 24, the corresponding letters (memory cells) are appropriately connected to the 15 n-bit inputs of the adder 14, in such a way as to form the word of which it is desired to form the energy. The adder 14 then calculates the total energy of the word.

If said energy is greater than the maximum value already calculated, the new maximum is stored in an appropriate register instead of the previous maximum value; likewise, the word and the corresponding frame offset are stored.

In order to generate the other 14 offsets corresponding to the same word, the registers which form the bank 22 (i.e., the registers which contain the energies of the individual letter in the 15 slots) are connected so as to form a circular buffer by means of circulating lines; two of these lines are designated by 220 in FIG. 3.

It is therefore sufficient to rotate the stored data by one position at a time to calculate with the same circuit the new value of the word for a given offset value. This procedure is performed for all the 64 possible words.

Figure 4:
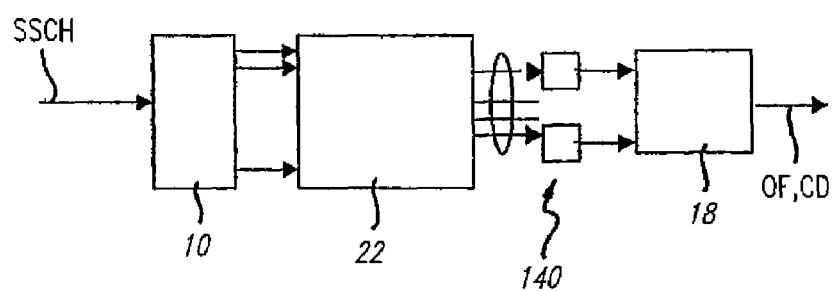
FIG. 4 illustrates a possible variant embodiment of the architecture represented in FIG. 2.

A possible variant of the architecture proposed is the one represented in FIG. 4. Here, instead of the adder 14 preceded by the multiplexer 24, a memory bank 140 is used. In practice, in the diagram of FIG. 4, one adder is used for each mask, and, in this way, the energy of the 64 words for the same offset is calculated in parallel.

At output from the adders 140, the maximum-detection module 18 finds and stores the maximum value with the corresponding word and position. Rotating the elements in the circular buffer of the bank of registers 22, the word energies for all the other offsets are obtained.

At the end of the operation, in the maximum-detection module 18 the maximum energy value is obtained, whilst in the word register the corresponding codegroup CD is present. In the offset register, instead, the frame offset OF with respect to the internal reference of the terminal is obtained.

The solution just described enables considerable advantages to be achieved as compared with the known solutions.

In particular, whether the solution represented in FIG. 2 is adopted or the solution of FIG. 4 is resorted to, given the same parameters, the circuit is considerably smaller than the traditional architecture represented in FIG. 1.

In particular, with reference to the dimensions previously given by way of example, the traditional solution requires a memory comprising 64*15*(N+4) bits, where N is the number of bits at output from the generic correlator, and the numeric value 4 represents the approximation of the value $\log_2 15$.

The solution described herein enables a reduction of the dimensions of the memory to a value equal to 16*15N, where N is the number of bits at output from the generic correlator.

The solution according to one embodiment of the invention moreover enables a simplification of the calculation algorithm, and hence a reduction in area for the calculation of the codegroup and offset. In addition, the solution according to an embodiment of the invention enables a considerable reduction in power consumption.

Of course, without prejudice to the principles of the invention, the details of implementation and the embodiments may be amply varied with respect to what is described and illustrated herein, purely by way of non-limiting example, without thereby departing from the scope of the present invention, as defined in the claims that follow.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A process for obtaining frame synchronization and identifying a cell codegroup in a cellular communication system in which a plurality of synchronization codes organized in chips or letters transmitted at a beginning of respective slots is available, the process comprising:
   acquiring, starting from said synchronization codes, energy values corresponding to respective individual letters with reference to possible starting positions of a corresponding frame within a respective slot;
   determining energies of corresponding words, storing just a maximum word-energy value and information for a corresponding starting position, said maximum word-energy value and said information regarding the position identifying, respectively, said cell codegroup and a frame synchronization;
   providing a memory organized in registers, each of which contains energies of the individual letters of a code for all possible staffing positions of the corresponding frame within the respective slot, said registers being connected as circular buffers; and
   causing content of said circular-buffer registers to rotate by one position at a time for calculating successive word energy values corresponding to different possible starting positions of the corresponding frame within the respective slot.

2. The process according to claim 1 wherein said energy values corresponding to the respective individual letters are obtained by subjecting said synchronization codes to an operation selected from at least one of a correlation operation and a fast Hadamard transform operation.

3. The process according to claim 1 wherein said energies of the corresponding words are determined in a serial way at an end of acquisition of said values of energies corresponding to the respective individual letters.

4. The process according to claim 1, further comprising determining in parallel the energies of said corresponding words for said possible staffing positions of the corresponding frame within the respective slot.

5. A system to obtain frame synchronization and identifying a cell codegroup in a cellular communication system in which a plurality of synchronization codes organized in chips or letters transmitted at a beginning of respective slots, the system comprising:
   an acquisition module to acquire, starting from said synchronization codes, energy values corresponding to respective individual letters with reference to possible starting positions of a corresponding frame within a respective slot;
   a processing assembly to determine energies of corresponding words, to store just a maximum word-energy value and information for a corresponding starting position, said maximum word-energy value and said information regarding the position identify, respectively, said cell codegroup and a frame synchronization; and
   a memory organized in registers, each of which can contain energies of the individual letters of a code for all possible staffing positions of the corresponding frame within the respective slot, said registers being connected as circular buffers, which are able to rotate by one position at a time content of said circular-buffer registers to calculate successive word energy values corresponding to different possible staffing positions of the corresponding frame within the respective slot.

6. The system according to claim 5 wherein said acquisition module includes at least one of a correlator module and a module which carries out an operation of fast Hadamard transform.

7. The system according to claim 5 wherein the processing assembly includes an accumulator module to determine said energies of the corresponding words in a serial way at an end of acquisition of said values of energies corresponding to the respective individual letters.

8. The system according to claim 5 wherein the processing assembly includes a plurality of processing modules set in parallel to determine in parallel the energies of said corresponding words for said possible staffing positions of the corresponding frame within the respective slot.

9. The system according to claim 5 wherein the acquisition module and processing assembly are included in a receiver for a telecommunication system based upon a standard from at least one of 3GPP FDD, UMTS, CDMA2000, IS95, and WBCDMA.

10. An apparatus, comprising:
    a first unit to receive a plurality of synchronization codes organized in letters that are transmitted at a beginning of respective slots;
    a second unit coupled to the first unit to acquire, starting from the received synchronization codes, energy values corresponding to respective individual letters;
    a third unit coupled to the second unit to determine energies of words corresponding to sums of the acquired energy values of the respective individual letters; and
    a fourth unit coupled to the second unit to store a maximum word energy value that identifies a cell codegroup and information for a corresponding starting position that identifies a frame offset, said fourth unit including:
    a storage unit organized into registers, each of the registers able to contain energy values of individual letters of a code for all possible starting positions of a corresponding frame within a respective slot, wherein the registers are coupled as circular buffers that can rotate their content by one position at a time to calculate successive word energy values corresponding to different possible starting positions of a corresponding frame within the respective slot.

11. The apparatus of claim 10 wherein the second unit comprises at least one of a bank of correlator modules and a bank of modules to perform fast Hadamard transforms.

12. The apparatus of claim 10 wherein the third unit includes an accumulator module to serially determine energies of the words subsequent to acquisition of the energy values corresponding to individual letters.

13. The apparatus of claim 10 wherein the third unit includes a plurality of parallel processing modules to determine in parallel energies of corresponding words for possible staffing positions of a corresponding frame with a respective slot.

14. The apparatus of claim 10, further comprising:
a multiplexer coupled to the second unit to receive the acquired energy values of the letters;
an adder coupled to the multiplexer to calculate energy of a word from the acquired energy values of the letters; and
a maximum-detection module coupled to the adder to compare a received energy of a word from the adder with a previously received energy of a word, and to keep whichever of the energies of the word is greater.

15. A method, comprising:
receiving a plurality of synchronization codes organized in letters that are transmitted at a beginning of respective slots;
acquiring, staffing from the received synchronization codes, energy values corresponding to respective individual letters;
serially calculating an energy of a word based on the acquired energy values of the respective individual letters; and
storing a maximum word energy value that identifies a cell codegroup and information for a corresponding staffing position that identifies a frame offset, wherein storing the maximum word energy value includes replacing a previously calculated word energy value with a new calculated word energy value if the new calculated word energy value is greater than the previously calculated word energy value.

16. The method of claim 15, further comprising parallel calculating a plurality of word energies for all possible frame offsets.

17. The method of claim 15, further comprising rotating contents of a buffer having the acquired energy values of individual letters one position at a time to calculate successive word energy values corresponding to different starting possible positions of a corresponding frame within a respective slot.

18. A system, comprising:
a means for receiving a plurality of synchronization codes organized in letters that are transmitted at a beginning of respective slots;
a means for acquiring, staffing from the received synchronization codes, energy values corresponding to respective individual letters;
a means for calculating an energy of a word based on the acquired energy values of the respective individual letters;
a buffer means for storing a maximum word energy value that identifies a cell codegroup and information for a corresponding starting position that identifies a frame offset; and
a means for rotating contents of said buffer means, said buffer means having the acquired energy values of individual letters, one position at a time to calculate successive word energy values corresponding to different staffing possible positions of a corresponding frame within a respective slot.

19. The system of claim 18, further wherein said means for calculating includes a means for parallel calculating a plurality of word energies for all possible frame offsets.

20. The system of claim 18 wherein said buffer means includes a means for replacing a previously calculated word energy value with a new calculated word energy value if the new calculated word energy value is greater than the previously calculated word energy value.

21. An apparatus, comprising:
a first unit to receive a plurality of synchronization codes organized in letters that are transmitted at a beginning of respective slots;
a second unit coupled to the first unit to acquire, starting from the received synchronization codes, energy values corresponding to respective individual letters;
a third unit coupled to the second unit to determine energies of words corresponding to sums of the acquired energy values of the respective individual letters;
a fourth unit coupled to the third unit to store a maximum word energy value that identifies a cell codegroup and information for a corresponding staffing position that identifies a frame offset;
a multiplexer coupled to the second unit to receive the acquired energy values of the letters;
an adder coupled to the multiplexer to calculate energy of a word from the acquired energy values of the letters; and
a maximum-detection module coupled to the adder to compare a received energy of a word from the adder with a previously received energy of a word, and to keep whichever of the energies of the word is greater.

22. The apparatus of claim 21 wherein said fourth unit includes a plurality of registers coupled as a circular buffer.

23. The apparatus of claim 22 wherein said circular buffer is adapted to rotate, by one position at a time, content to calculate successive word energy values corresponding to different possible starting positions of a corresponding frame within the respective slot.

24. A method, comprising:
receiving a plurality of synchronization codes organized in letters that are transmitted at a beginning of respective slots;
acquiring, staffing from the received synchronization codes, energy values corresponding to respective individual letters;
serially calculating an energy of a word based on the acquired energy values of the respective individual letters;
storing a maximum word energy value that identifies a cell codegroup and information for a corresponding starting position that identifies a frame offset; and
rotating contents of a buffer having the acquired energy values of individual letters one position at a time to calculate successive word energy values corresponding to different starting possible positions of a corresponding frame within a respective slot.

25. The method of claim 24 wherein storing the maximum energy value includes replacing a previous maximum word energy value with a new maximum word energy value having a greater value.

26. The method of claim 24 wherein rotating said buffer includes rotating contents of registers coupled as a circular buffer.

* * * * *

UNITED STATES PATENT AND TRADEMARK OFFICE
CERTIFICATE OF CORRECTION

PATENT NO. : 7,292,664 B2  Page 1 of 1
APPLICATION NO. : 10/684217
DATED : November 6, 2007
INVENTOR(S) : Francesco Pappalardo et al.

It is certified that error appears in the above-identified patent and that said Letters Patent is hereby corrected as shown below:

Column 5
Line 49, "staffing" should read as -- starting --

Column 6
Line 3, "staffing" should read as -- starting --

Column 6
Line 8, "staffing" should read as -- starting --

Column 7
Line 23, "staffing" should read as -- starting --

Column 7
Line 42, "staffing" should read as -- starting --

Column 7
Line 56, "staffing" should read as -- starting --

Column 7
Line 58, "further wherein said means" should read as -- wherein said means --

Column 8
Line 40, "staffing" should read as -- starting --

Signed and Sealed this

Twenty-fourth Day of June, 2008

JON W. DUDAS
*Director of the United States Patent and Trademark Office*